J. NORGREN.
RESILIENT VEHICLE WHEEL.
APPLICATION FILED JAN. 30, 1909.

952,754.

Patented Mar. 22, 1910.
2 SHEETS—SHEET 1.

Witnesses:

Inventor:
John Norgren
by Joshua R. H. Potts
Attorney

UNITED STATES PATENT OFFICE.

JOHN NORGREN, OF CHICAGO, ILLINOIS.

RESILIENT VEHICLE-WHEEL.

952,754. Specification of Letters Patent. Patented Mar. 22, 1910.

Application filed January 30, 1909. Serial No. 475,212.

*To all whom it may concern:*

Be it known that I, JOHN NORGREN, a citizen of the United States, residing at Chicago, county of Cook, and State of Illinois, have invented certain new and useful Improvements in Resilient Vehicle-Wheels, of which the following is a specification.

My invention relates to improvements in resilient vehicle wheels, and has for its object to provide a wheel of this character that shall be inexpensive in construction and thoroughly efficient and reliable in use.

A further object of my invention is to provide means whereby the axes of the spiral springs used in the hub of the wheel to produce the desired resiliency shall be maintained in coincidence with radii of the hub even when a slight rotation of the wheel on the hub proper is provided for as in the present invention.

Other objects will appear hereinafter.

With these objects in view my invention consists in certain details of construction and arrangement of parts all as will be hereinafter fully described and more particularly pointed out in the appended claim.

Figure 1:
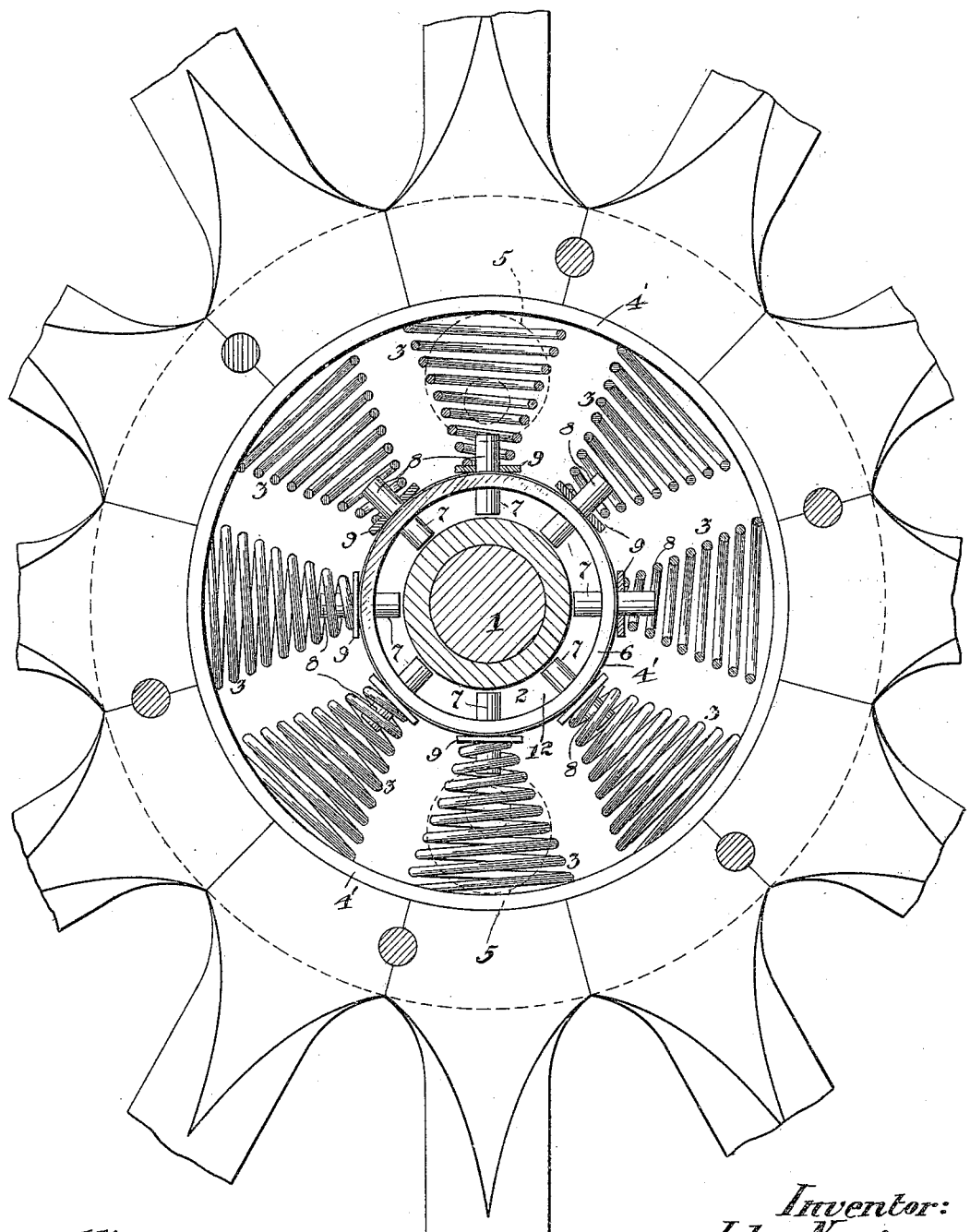
Figure 2:
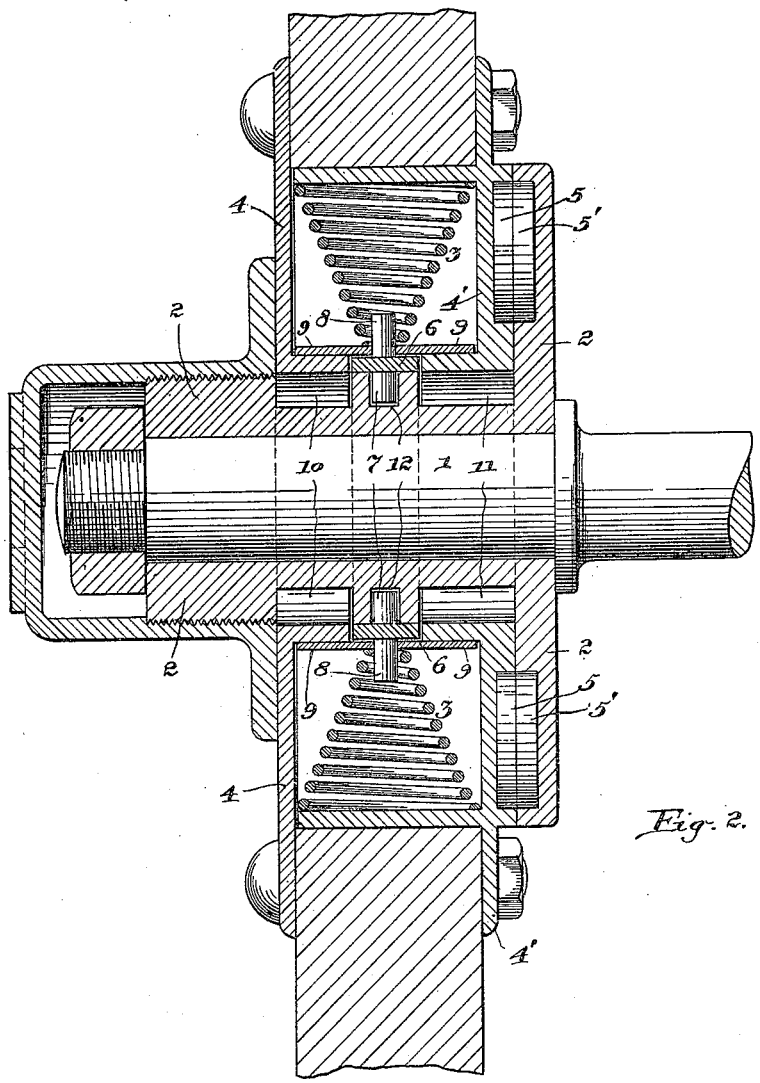

My invention will be more readily understood by reference to the accompanying drawings forming a part of this specification, and in which, Figure 1 is a fragmentary view of a vehicle wheel embodying my invention in its preferred form showing a portion of the hub in cross section and Fig. 2 is a central sectional view thereof.

Referring now to the drawings 1 indicates a vehicle axle arm and 2 a wheel hub mounted thereon. Conoidal springs 3 are interposed between the hub proper and the outer or spoke receiving portions of the hub 4 and 4' which are adapted to rotate slightly relative to the hub proper 2, the eccentrics 5 and 5' limiting this rotation. Heretofore in similar constructions provided with the eccentric stops as shown in the present invention, the conoidal springs have usually been rigidly secured or seated on the hub proper, so that during the slight relative rotation of the outer portion of the hub the springs have a tendency to be tipped over, this distortion causing excessive friction and wear of the contacting surfaces and also frequent spring breakage. To overcome this difficulty, means are provided in the present invention whereby the inner seating of the springs may rotate in accordance with the slight rotation of the outer seatings thereof, and more specifically a ring 6 is provided which is loosely mounted on the hub 2, inwardly and outwardly extending radial pins 7 and 8, respectively, secured in said ring, rectangular plates 9 provided with central perforations to receive said outwardly extending pins, and said plates forming the inner seatings for said springs whereby free rotation is permitted. The circumferential groove 10 in the hub 2 is provided to receive the portion 4, and the groove 11 is provided to receive the portion 4', said portions being adapted to move radially in said grooves according to the load stresses. The circumferential groove 12 formed in the hub 2 acts as a guide for the pins of the ring 6.

As aforesaid the function of the eccentrics 5 and 5' is to limit the rotation of the portions 4 and 4' on the hub proper 2, but nothing novel is claimed for this construction, my invention being limited to the free rotatable ring 6 and the elements connected therewith.

While I have shown what I deem to be the preferable form of my invention and a modification thereof, there might be still further slight modifications without departing from the spirit of my invention.

Having described my invention what I claim as new and desire to secure by Letters Patent is:

In a resilient vehicle wheel, a hub provided with circumferential grooves adapted to receive portions in which the wheel spokes are mounted, a ring loosely mounted on said hub between said grooves, a plurality of radially disposed inwardly and outwardly extending pins secured in said ring, a plurality of rectangular plates resting in said portions and loosely mounted on said outwardly extending pins, a circumferential groove in said hub located between said grooves, said inwardly extending pins projecting into said groove, and conoidal springs contained within said portions seating on said plates and surrounding said outwardly extending pins, substantially as and for the purposes set forth.

In testimony whereof I have signed my name to this specification in the presence of two subscribing witnesses.

JOHN NORGREN.

Witnesses:
ARTHUR A. OLSON,
JOSHUA R. H. POTTS.